United States Patent [19]

Keller

[11] 4,441,112

[45] Apr. 3, 1984

[54] NON-IMPACT DOT MATRIX PRINTER

[76] Inventor: Michael I. Keller, 1935 Hawthorne, Alexandria, Va. 22311

[21] Appl. No.: 355,026

[22] Filed: Mar. 5, 1982

[51] Int. Cl.$^3$ .............................................. G01D 15/08

[52] U.S. Cl. ...................................................... 346/163

[58] Field of Search ..................... 358/300; 346/153.1, 346/155, 162–165, 139 C; 101/DIG. 13; 400/124

[56] References Cited

U.S. PATENT DOCUMENTS

| | | | |
|---|---|---|---|
| 3,703,949 | 11/1972 | Howard et al. | 400/124 |
| 3,711,860 | 1/1973 | Medlar | 346/162 |
| 3,739,087 | 6/1973 | Metcalfe et al. | 346/162 X |
| 4,100,551 | 7/1978 | King et al. | 346/162 |
| 4,139,856 | 2/1979 | Peterson et al. | 346/163 |
| 4,186,406 | 1/1980 | Bahr et al. | 346/163 |
| 4,264,913 | 4/1981 | Makano et al. | 346/162 |

OTHER PUBLICATIONS

"Chip Eases Hosts Printer's Duties", *Electronics* Jan. 3, 1980.

*Primary Examiner*—Thomas H. Tarcza

*Attorney, Agent, or Firm*—Arthur I. Spechler; Werten F. W. Bellamy

[57] ABSTRACT

The non-impact dot matrix printer is a high speed alpha-numeric, electric spark discharge printer that utilizes a rotating perforated dielectric belt in cooperative association with a laminar stack of insulated electrical conductors to control electric spark discharge printing on an electrical conductive erosive surface of a recording medium. The belt is disposed between the laminar stack and the conductive surface of the recording medium, and alpha-numeric characters are printed on the printing surface by applying a controlled source of voltage between the printing surface and the stack to cause spark discharging through the perforations in the rotatable belt, under the overall control of appropriate electronic circuitry.

5 Claims, 2 Drawing Figures

NON-IMPACT DOT MATRIX PRINTER

RIGHTS OF THE GOVERNMENT

The invention described herein may be manufactured and used by or for the Government of the United States of America for all governmental purposes without the payment of royalties thereon.

BACKGROUND OF THE INVENTION

This invention relates generally to electric spark discharge recording. More particularly the invention relates to a novel non-impact dot matrix printer of the type that prints alpha-numeric characters on an electrical conductive and erosive surface of a recording medium. The novel printer is particularly useful for, although not limited to, alpha-numeric, high speed, digital communications and computer outputs.

Non-impact printing by electric discharge (electroerosion) printing means to print characters on an electrosensitive recording medium was accomplished in the prior art primarily by means of contacting styli mounted on a printing head assembly that moved across the recording medium for printing each line of characters. Such prior-art printing apparatus comprised many moving parts, such as the printing head assembly, electrical conductors attached to the styli of the head, and drive means for the head; and these moving parts were potential sources of mechanical failure.

It has been disclosed in U.S. Pat. No. 3,711,860 for an "Arc Discharge Recording Apparatus with Pigment Carrier" to provide a printing system with an apertured, rotatable belt of dielectric material that moved across a recording surface of a non-erosive recording medium along a recording line. A pigmented carrier was positioned between the belt and a first electrical conductor, and a second electrical conductor supported the recording medium on a surface opposite to the recording surface. A selectively operable high voltage was applied between the first and second electrical conductors to induce an electrical discharge through the pigmented carrier, the aperture in the moving belt, and the recording surface. The electrical discharge transferred some of the pigment from the carrier to the non-erosive recording surface to produce a visible recording on the recording surface. This prior-art apparatus was a pigment deposition scheme for producing graphs on a medium that was not electroerosive, along two axes, and the apparatus could not be used for an alpha-numeric dot matrix printer.

SUMMARY OF INVENTION

The novel non-impact dot matrix printer of the present invention is intended to print alpha-numeric characters on an electrosensitive recording medium having an electroerosive surface to thereby eliminate the need for an ink carrier. A rotatable dielectric belt, formed with a plurality of holes, is disposed between the recording surface of the recording medium and a laminar stack of electrodes. Means are provided to cause an electric spark discharge to flow between selected electrodes and the recording surface through selected apertures of the belt, in accordance with selected signals, whereby to print selected dot matrix characters on the recording surface by means of electroerosion.

The novel dot matrix printer of the present invention therefore does not require inking means, has a minimum of moving parts, and requires fewer adjustments and less maintenance than the prior-art non-impact dot matrix printers of the moving head styli type.

DESCRIPTION OF THE PREFERRED EMBODIMENT

Figure 1:
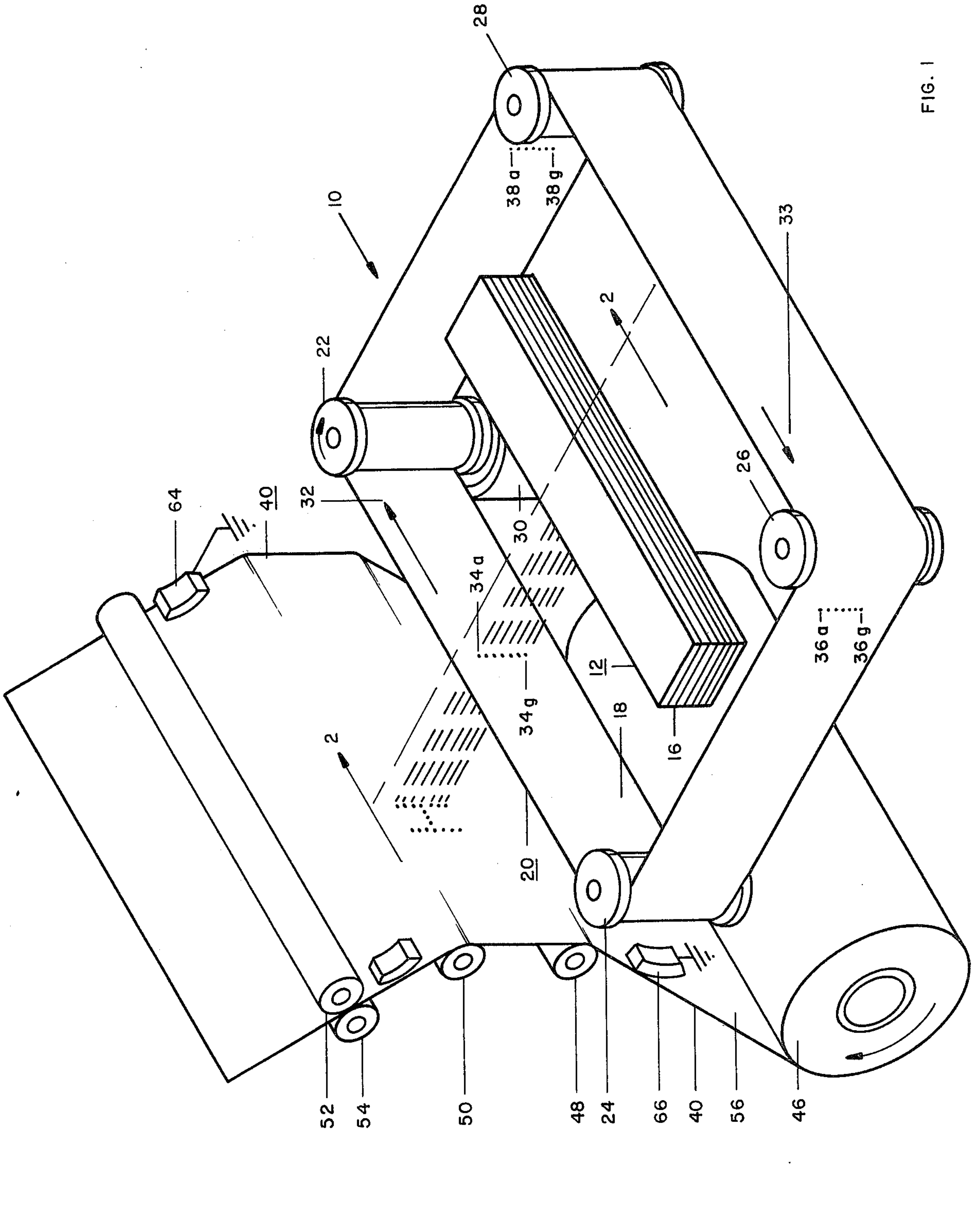
FIG. 1 is an exploded perspective, plan view of the mechanical structure of the novel dot matrix printer with electrical and electronic parts omitted for the sake of clarity.
Figure 2:
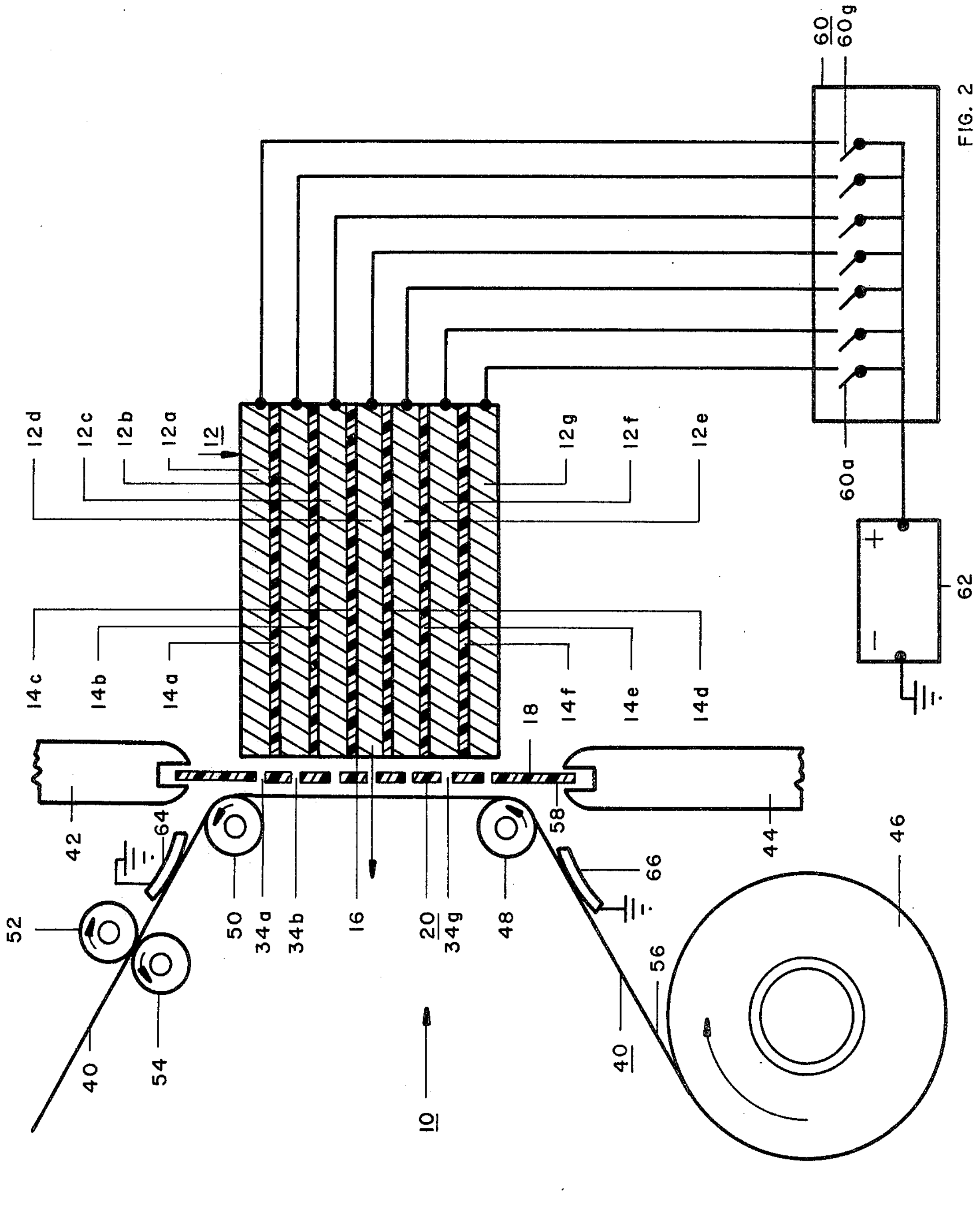
FIG. 2 is an enlarged cross-sectional view of a portion of the structure shown in FIG. 1, taken along the line 2—2, viewed in the direction indicated by the arrows, and showing a schematic diagram of the electronic control signal circuitry partly in block diagram form.

Referring now to FIGS. 1 and 2 of the drawing, in which similar parts have similar reference designations, there is shown the mechanical structure 10 of the novel dot matrix printer of the present invention. The structure 10 comprises a stationary laminar stack 12 of a plurality (preferably seven) of electrical conductors **12*a*–12*g* (as shown in FIG. 2). The conductors 12*a*–12*g* are electrically insulated from each other by a plurality (preferably six) of insulators 14*a*–14*f* (FIG. 2) which are thin layers of suitable insulative material. The stack 12 is formed with a substantially planar surface 16 adjacent to one surface 18 of an endless seamless, and perforated, dielectric belt 20**, for purposes hereinafter appearing.

The dielectric belt 20 is made preferably from a suitable plastic sheet material, such as "Mylar ®," having the requisite mechanical and dielectric characteristics, and is supported for rotation around the stack 12 by a plurality of rollers, such as rollers 22, 24, 26, and 28. A motor 30 is coupled to the roller 22, and the rollers 24, 26, and 28 may be idler rollers for rotating the belt around the stack 12 in the direction of the arrows 32 and 33. A dielectric belt having a uniform thickness, such as would be obtained by a seamless belt, assures that the gap between the laminar stack 12 and recording surface 56 is minimized, thereby reducing the electric potential required to obtain the spark discharge.

The belt 20 is formed with a plurality (preferably seven) of holes **34*a*–34*g* disposed transversely, that is, in a line substantially perpendicular to, and between the upper and lower edges of the belt 20. Each of the holes 34*a*–34*g* is disposed directly adjacent to the edges of the conductors 12*a*–12*g* of the stack 12, along the planar surface 16, as shown in FIG. 2. Suitably dimensioned holes can be formed in the belt 20** by laser drilling means, well known in the art.

The belt 20 may be formed with more than one set of holes. Thus, as shown in FIG. 1, three sets of holes **34*a*–34*g*, 36*a*–36*g*, and 38*a*–38*g* are provided. The horizontal distance between each set of holes should be no less than the length of a printed characters on a recording medium. By providing the seven electrical conductors 12*a*–12*g* and the corresponding seven holes in a set of holes, for example, holes 34*a*–34*g*, adjacent to each other, respectively, it is possible to print alpha-numeric dot matrix characters on an electrosensitive erosive recording medium 40** by columns of seven dots and rows of five dots, that is, by a 5×7 dot matrix, in a manner to be hereinafter described.

Optional belt guide members 42 and 44 are disposed along the opposite edges of the belt 20, respectively, to guide the belt 20 adjacent to the substantially planar surface 16 of the stack 12.

The recording medium 40 may be supplied in a roll 46 so that it can be passed over guide rollers 48 and 50 and pulled upwardly between pressure rollers 52 and 54, as shown in FIG. 2. The recording medium 40 may be any one of the electrosensitive recording media, well known in the art, that is used in electric discharge printing, whereby printing is accomplished by the electroerosion of an electrical conducting surface of the recording medium. Electrical conducting surfaces are usually metallic coatings. A recording medium that may be used with the novel dot matrix printer is described in U.S. Pat. No. 4,264,913, which is incorporated herein by reference.

Thus, the recording medium 40 can comprise a commercially available paper having an electrically conductive erosive surface 56 disposed adjacent to side 58 of the belt 20. In operation, the conductive surface 56 of the recording medium 40 and the planar side 16 of the stack 12 are as close to the rotatable belt 20 as possible, without impending the rotation of the belt 20. To simplify the limited mechanics, the belt 20 is rotated continuously. Thus, the recording medium 40 can either remain stationary during the recording of a line or move continuously by means of rollers 52 and 54. If the recording medium 40 moves continuously, the dielectric belt 20 and laminar stack 12 should be angled to align the last character position on a recording line on said recording medium relative to the movement rates and corresponding displacements to thereby properly print the last character in the requisite position.

Means are provided to supply control signals selectively to the electrodes **12*a*–12*g*, whereby to produce electric spark discharges selectively between the electrodes 12*a*–12*g* and the conductive surface 56 of the recording medium 40 through selective holes 34*a*–34*g* in the belt 20 to form selected dot matrix characters on the conductive erosive surface 56. To this end, each of the electrodes 12*a*–12*g* is electrically connected to character decoder matrix control circuitry 60, well known in the dot matrix printing art, and represented herein collectively by the block diagram 60. The positive terminal of a voltage source 62 of suitable voltage for providing a suitable spark discharge is connected to the control circuitry 60 to apply voltages to the electrodes 12*a*–12*g* through switches 60*a*–60*g*. The negative terminal of the voltage source 62 is grounded. Grounded electrically non-erosive conductive bushes 64 and 66 are also in contact with the conductive surface 56 of the recording medium 40. Although the switches 60*a*–60*g* are represented schematically as mechanical switches, it will be understood that they may be of any suitable electronic type; and although no control circuitry 60** is shown, it may be similar to that represented by FIG. 1 of U.S. Pat. No. 3,703,949 which is incorporated herein by reference.

Suitable control circuitry 60 can also be provided by a large scale integrated printer-control circuit, the μPD781, made by NEC Microcomputers Inc. of Wellesley, Mass. and described in "Electronics," Jan. 3, 1980. The μPD781 is also incorporated herein by reference for the control circuitry 60.

In operation, the novel dot matrix printer prints alpha-numeric characters on the conductive surface 56 of the recording medium 40 by the electroerosion of the surface 56. The electroerosion is produced by the energy in controlled sparks between selected electrodes **12*a*–12*g* and the conductive surface 56, through corresponding selected holes 34*a*–34*g*, in accordance with selected signals from the control circuitry 60. After one set of holes 34*a*–34*g* in the belt 20 sweeps across the recording medium 40, the next set of holes 36*a*–36*g* is in position to sweep cross the recording medium. Also, the set of holes 38*a*–38*g* will be in position to sweep across the recording medium 40 when the holes 36*a*–36*g* have left the recording medium 40**.

The control circuitry 60 includes means to control the rotation of the belt 20 and the feed of recording medium 40. Hence, after one line of dot matrix characters is printed, as through one set of holes **34*a*–34*g*, the recording medium is raised and the next line of dot matrix characters can be printed through holes 36*a*–36*g*. The following line of dot matrix characters is printed through the holes 38*a*–38*g*, and the following line is printed through the holes 34*a*–34*g***. It will be apparent to those skilled in the art that more than one line may be printed at a time by providing a multi-line wide belt with an appropriately displaced series of apertures and corresponding conductive surfaces of an expanded laminar stack. By these means it is therefore possible to print a full range of multiple lines as well as a range of font sizes and styles without mechanical adjustment.

Thus, there has been shown and described a novel non-impact dot matrix printer that eliminates the need for ink carriers, requires less moving parts and moving wires than prior-art printers, and is capable of high speed operation.

I claim:

1. A non-impact dot matrix printer, for recording complete alpha-numeric characters sequentially one at a time on a recording medium having an electrical conductive erosive surface, comprising a laminar stack of a plurality of electrical conductors having edges that define a planar surface, and each conductor being separated from the other by an electrical insulator, a dielectric endless belt having opposite surfaces and formed with a plurality of similar holes disposed transversely and linearly between the edges of said belt, means to rotate said belt with one of its surfaces directly adjacent but spaced from said planar surface of said electrodes and each of said holes aligned with a separate edge of said conductors, respectively, means to dispose said conductive surface of said recording medium directly adjacent but spaced from the other of said surfaces of said belt, and means including said conductive surface as an electrode to provide electric spark discharges between selected conductors of said stack and said conductive surface of said recording medium, through selected holes of said belt, in accordance with signals applied to said conductors through control circuitry whereby to erode said conductive surface selectively and to provide said complete alpha-numeric characters sequentially.

2. A non-impact dot matrix printer as described in claim 1 wherein:

said plurality of conductors is seven, and wherein said plurality of holes in said belt comprises at least one set of seven holes.

3. A non-impact dot matrix printer as described in claim 2 wherein:

said holes in said one set of seven holes are formed in a line between the edges of said belt and substantially perpendicular to the edges of said belt.

4. A non-impact dot matrix printer as described in claim 2 wherein:

said plurality of holes in said belt comprises at least two sets of seven holes in each set, and said holes in each set of holes define a line that is substantially perpendicular to the edges of said belt.

5. A non-impact dot matrix printer as described in claim 1 wherein said belt is seamless, and means are provided to guide said one surface of said belt in its rotation adjacent said planar surface of said electrodes, and means are provided to guide the conductive surface of said recording medium adjacent the other surface of said belt.

* * * * *